United States Patent [19]
Kobayasi et al.

[11] 4,020,908
[45] May 3, 1977

[54] REVERSIBLE PLOW

[75] Inventors: Makoto Kobayasi, Ueda; Minoru Hiramoto, Maruko, both of Japan

[73] Assignee: Matsuyama Plow Mfg. Co., Ltd., Japan

[22] Filed: Dec. 18, 1975

[21] Appl. No.: 642,064

[52] U.S. Cl. .............................. 172/742; 172/723; 172/730; 172/733; 172/764; 172/773

[51] Int. Cl.² ................. A01B 15/20; A01B 15/02

[58] Field of Search .......... 172/204, 218, 219, 742, 172/667, 223, 723, 730, 733, 764, 773

[56] References Cited
UNITED STATES PATENTS

| | | | |
|---|---|---|---|
| 298,604 | 5/1884 | Mendenhall | 172/742 |
| 382,179 | 5/1888 | McCluey | 172/719 |
| 671,864 | 4/1901 | Morelock et al. | 172/218 |
| 3,918,528 | 11/1975 | Kinzenbaw | 172/218 |

*Primary Examiner*—George J. Marlo
*Attorney, Agent, or Firm*—James E. Nilles

[57] ABSTRACT

A reversible plow comprising a regulating frame, a plow body attached to the regulating frame, a reversing rod rotatably attached to the regulating frame and connected to the plow body, and a fixing member supported by said regulating frame. The reversible plow further comprises a fixing plate provided on the regulating frame, an engaging plate capable of engaging with said fixing plate rotatably supported by the regulating frame, and a handle provided on said engaging plate.

3 Claims, 10 Drawing Figures

REVERSIBLE PLOW

The present invention relates to a reversible plow capable of attaining an easy and smooth plowing operation even at the place where a tractor can not enter directly.

Accordingly, a primary object of the present invention is to provide a reversible plow whose plow body can be turned round to the left or right side at the time of normal plowing operation while it can be shifted and then turned round to the left or right side at the time of plowing operation at the ridge between rice fields or under low branches of a tree.

Another object of the present invention is to provide a reversible plow capable of easily turning round the plow body by selecting one of the fixing plates of a fixing member according to the extent to which a regulating frame has been regulated to shift the plow body and by engaging a reversing rod with the selected fixing plate, thus permitting an even and continuous plowing operation to be attained.

These and other objects as well as merits of the present invention will be apparent from the following detailed description with reference to the accompanying drawings, in which.

Figure 1:
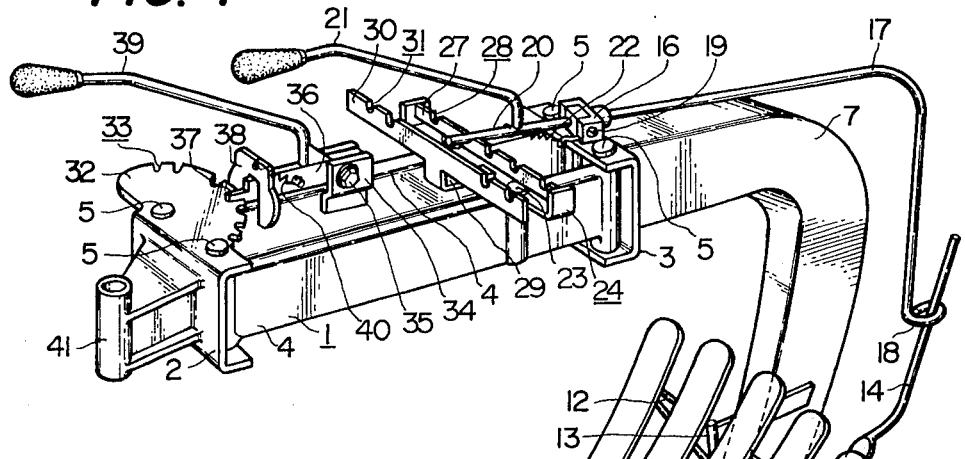
FIG. 1 is a perspective view of a reversible plow of the present invention.
Figure 2:
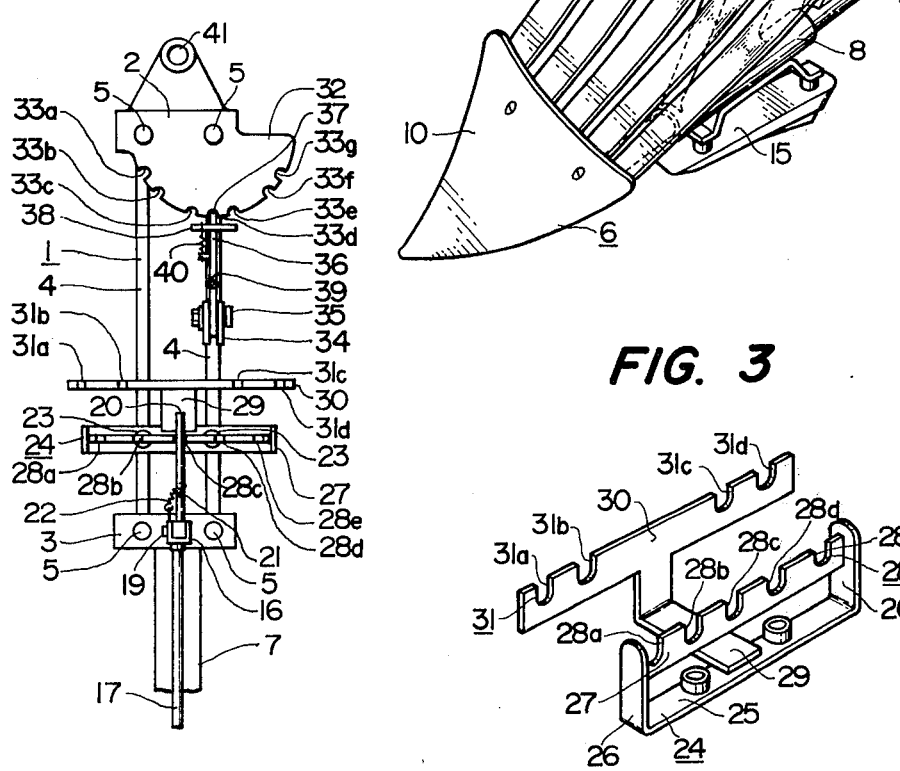
FIG. 2 is a plane view of the reversible plow shown in FIG. 1.

Referring to the drawings, numeral 1 represents a regulating frame comprising a front frame member 2, a back frame member 3 and side frame members 4 spaced parallel to each other wherein both ends of the side frame members 4 are rotatably connected to the front and the back frame members, respectively, by means of pins 5 so as to form a movable parallelogram together with the front and the back frame members.

To the back frame member 3 is attached a plow body 6, which is publicly known, through an arm 7 of reversed L-shape. More particularly, to the back frame member 3 is fixed the front end of the arm 7 and to the bottom end of the arm 7 is secured a sleeve 8 progressively slanting in the forward and the lower directions. Through the sleeve 8 is freely rotatably inserted a rotary shaft 9 whose front end is provided with a plow share 10 and to the back side of the plow share 10 are pivotably attached the bottom ends of plural plate bars 11. To the upper back sides of these plate bars 11 is rotatably attached a connection frame 12 with which is engaged an engaging rod 13 attached to the arm 7. To the back end of the rotary shaft 9 is secured the bottom end of a reversing rod 14 and to the underside of the sleeve 8 is attached a plowing base 15.

A rotating member 16 is provided at the center and on the upper surface of the back frame member 3 so as to freely rotate in a horizontal plane and to this rotating member 16 is fixed the front end of a reversing rod 17 of reversed L-shape. The bottom end of this reversing rod 17 forms an engaging ring 18 through which is slidably inserted the upper end of the reversing rod 14. The back end of an engaging rod 20 for engaging with the reversing rod 17 is connected to the rotating member 16 by means of a pin 19 so as to freely rotate in a vertical plane. From the middle upper surface of the engaging rod 20 is extending in the forward and the upper directions a handle 21 for turning round the plow body and between the engaging rod 20 and the rotating member 16 is arranged a coil spring 22 so as to usually urge the engaging rod in the lower direction.

Figure 3:
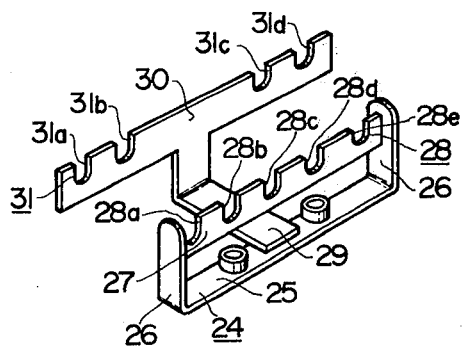
FIG. 3 is a perspective view of a fixing member used in the reversible plow of the present invention.

To the sides of the side frame members 4 is supported by means of rods 23 a fixing member 24 parallel to the back frame member 3. This fixing member 24 comprises, as shown in FIG. 3, a base plate 25 having flanges 26 vertically projecting at the both ends thereof; a first fixing plate 27 secured between these flanges 26 and having a plurality of recesses 28 at the upper portion thereof, namely, five recesses 28a, 28b, 28c, 28d and 28e in the embodiment of the present invention; a supporting arm 29 of L-shape attached to the front upper surface and at the center of the base plate 25; and a second fixing plate 30 secured to the upper end of the supporting arm 29 so as to be higher than the first fixing plate 27 and having a plurality of recesses 31 at the upper portion therof, namely four recesses 31a, 31b, 31c and 31d, each two of which is arranged at both sides of the fixing plate 30, respectively, in the embodiment of the present invention. The engaging rod 20 is arranged to be held in one of these fixing recesses 28 and 31.

The upper flange of the front frame member 2 has an integral semi-circular fixing plate 32 which is provided with a plurality of recesses 33 at the semi-circular circumference thereof, namely seven recesses 33a, 33b, 33c, 33d, 33e, 33f and 33g in the embodiment of the present invention as shown in the drawings.

To the middle portion of one side frame member 4 is attached a supporting member 34 to which is connected the back end of an engaging plate 36 by means of a shaft 35 so as to freely rotate in a vertical plane. There is projected from the front end of the engaging plate 36 an engaging projection 37 capable of engaging with any one of the recesses 33 of the fixing plate 32 and extending further in the forward direction through a guiding frame 38 provided on the side frame member 4. From the upper middle portion of the engaging plate 36 is extending in the forward and the upper directions a handle 39 for shifting the plow body. Between the engaging plate 36 and the guiding frame 38 is arranged a coil spring 40 so as to usually urge the engaging plate 36 in the upper direction.

At the front end of the front frame member 2 is provided a connector 41 for connecting to a tractor the reversible plow constructed as stated above at the time of plowing operation.

There will now be described the plowing operation of the reversible plow of the present invention.

The handle 21 for turning round the plow body is rotated in the upper direction with the pin 19 as its center of rotation so as to disengage the engaging rod 20 from one of the recesses 28 or 31 of the fixing member 24. Then, the other handle 39 for shifting the plow body is pressed down to cause the engaging projection 37 of the engaging plate 36 to be disengaged from the one of the recesses 33 with which the projection 37 has been engaged. Being kept in this state, the handle 39 is moved in the left or right direction while the regulating frame 1 is moved keeping both side frame members 4 parallel to each other. When located at a desired position relative any one of the recesses 33 of the fixing plate 32, the handle 39 is released from depression to rotatably return the engaging plate 36 in the upper direction by action of the spring 40 and to engage the projection 37 thereof with the desired one of the recesses 33. As a result, the regulating frame 1 is fixed at a desired angle relative to the front frame member 2 to determine the position of the plow body 6 relative to the tractor.

Figure 4:
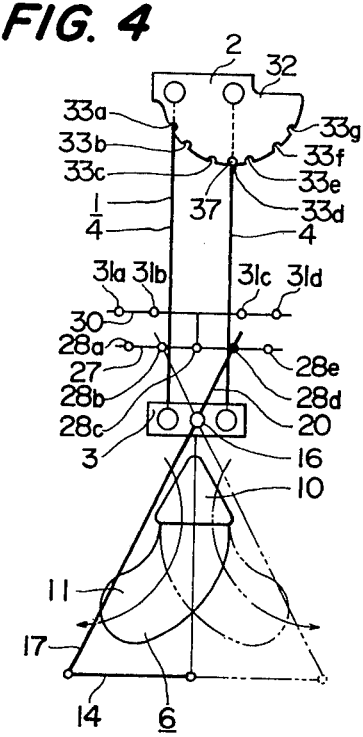
FIGS. 4 through 10 are views showing the functional operation of the reversible plow of the present invention.
Figure 5:
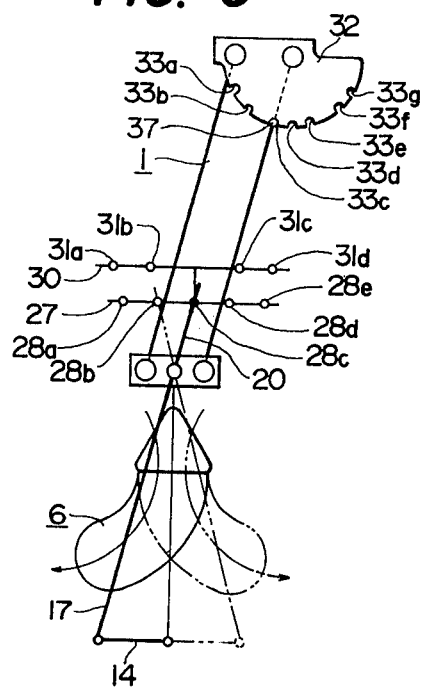
Figure 6:
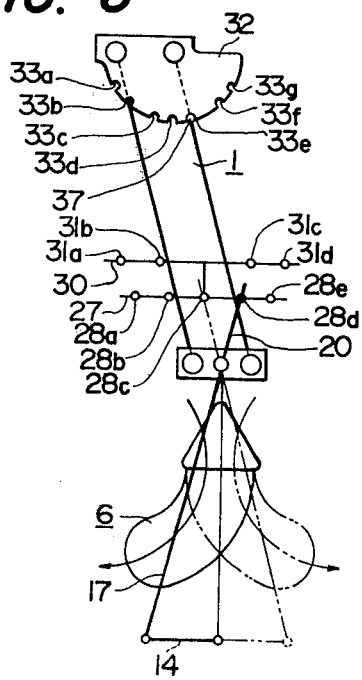
Figure 7:
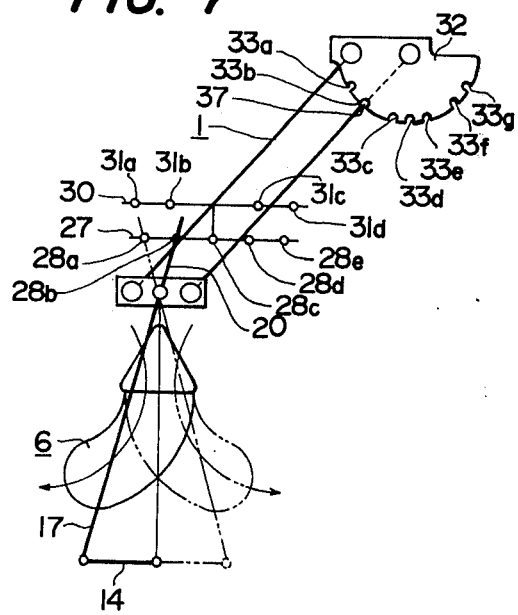
Figure 8:
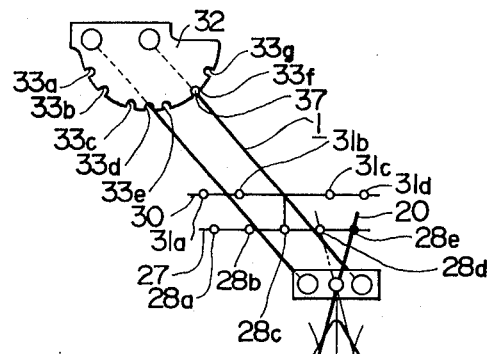
Figure 9:
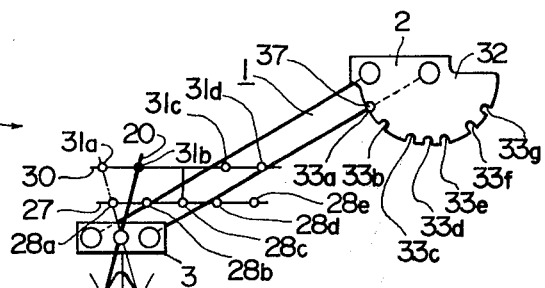
Figure 10:
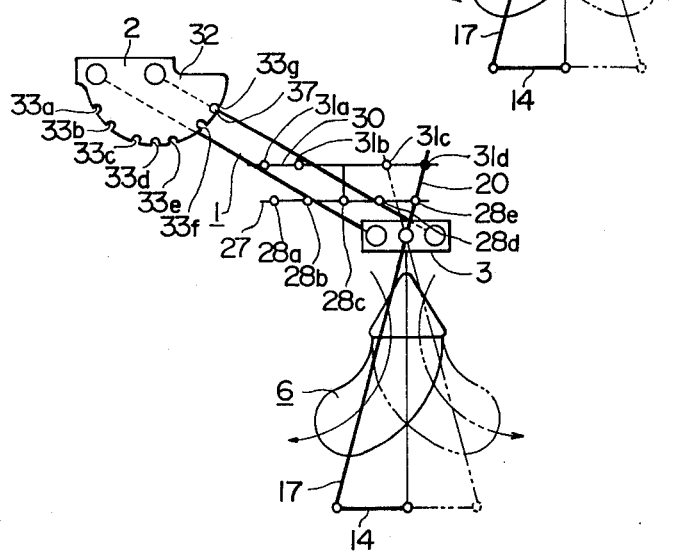

In case it is desirable that the plow body 6 is located at the back and on the center line of the tractor as shown in FIG. 4, the projection 37 of the engaging plate 36 is engaged with the recess 33d located at the center of the fixing plate 32; with the plow body 6 being shifted to the left or right side of the tractor as shown in FIGS. 5 or 6, the projection 37 with the recess 33c or 33e; with the plow body 6 being further shifted to the left or right side of the tractor as shown in FIGS. 7 or 8, the projection 37 with the recess 33b or 33f; and with the plow body 6 being shifted to the greatest extent to the left or right side of the tractor as shown in FIGS. 9 or 10, the projection 37 with the recess 33a or 33g.

When the position of the plow body 6 is thus determined relative to the tractor, the direction at which the plow share 10 and the plate bars 11 (that is, the plow body 6) are to be turned round will be set. Namely, the handle 21 which was kept in lifted state as stated above is now pressed down and moved to the left or right to rotate the reversing rod 17 through the engaging rod 20 and the rotating member 16; then, to rotate the reversing rod 14 through the engaging ring 18; and then, to rotate the rotary shaft 9 held in the sleeve 8 so that the plow share 10 and the plate bars 11 attached to the back upper portion of the plow share 10 (that is, the plow body 6) are turned round to the left or right. When this stage is finished, the handle 21 is further pressed down to cause the engaging rod 20 to be engaged with the desired one of the recesses 28 or 31 of the fixing member 24.

Accordingly, in case the plow body 6 has been located at the back and on the center line of the tractor as shown in FIG. 4 and the engaging rod 20 is engaged with the recess 28d of the first fixing plate 27 of the fixing member 24, the plow body 6 is turned round to the left so that the plowed earth will be guided and turned round in the left direction as shown by the solid arrow in FIG. 4, but when the engaging rod 20 is engaged with the recess 28b, the plow body 6 is turned round to the right so that the plowed earth will be guided and turned round in the right direction as shown by the dotted arrow in FIG. 4. Similarly, in case the plow body 6 has been shifted to the left or right side of the tractor as shown in FIGS. 5 or 6, the engaging rod 20 is engaged with any one of the recesses 28c, 28b and 28d to turn round the plow body 6 to the left or right; in case the plow body 6 has been further shifted to the left or right side of the tractor as shown in FIGS. 7 or 8, the engaging rod 20 is engaged with any one of the recesses 28b, 28d, 28a and 28e to turn round the plow body 6 to the left or right; and in case the plow body 6 has been shifted to the greatest extent to the left or right side of the tractor as shown in FIGS. 9 or 10, the engaging rod 20 is engaged with any one of the recesses 31b, 31d, 31a and 31c of the second fixing plate 30 of the fixing member 24 to turn round the plow body 6 to the left or right. More particularly, when the position of the plow body 6 relative to the tractor is kept as shown in any one of FIGS. 4 through 8, the engaging rod 20 extends only to engage with any one of the recesses 28 of the first fixing plate 27 of the fixing member 24.

However, when the plow body 6 is shifted to the left or right side of the tractor to the greatest extent by shifting said regulator frame as shown in FIGS. 9 and 10, a distance between the fixing member 24 and the back frame member 3 becomes smaller so that the engaging rod 20 comes to extend over the first fixing plate 27 to engage with any one of the recesses 31 of the second fixing plate 30 of the fixing member 24 for example with the recess 31b in case of FIG. 9 or with the recess 31d in case of FIG. 10.

Accordingly, the reversing rod 17 is engaged firmly through the engaging rod 20 with the second fixing plate 30 of the fixing member 24, so that the turning-round operations of the plow share 10 and the plate bars 11 of the plow body 6 can be positively effected.

The shifting and the turning-round operations of the plow body 6 may be performed individually. Or it may be arranged that the engaging rod 20 connected to the reversing rod 17 is in the first place engaged with any one of the recesses 28 and 31 of the fixing member 24 and that the handle 39 is then operated to bring the plow body 6 into the shifted and the turned-round states at the same time.

It will be apparent that both of the handles 21 and 39 can be operated by an operator sitting on the seat in the tractor.

It may be also arranged that the recesses 28 and 31 of the fixing member 24 are located at such angles as permit the respective recesses to be engaged with the engaging rod 20 connected to the reversing rod 17 or that each of the recesses 28 and 31 is freely and individually moved to correspond to any angles at which the engaging rod 20 is located.

What is claimed is:
1. A reversible plow comprising:
   a regulating frame 1 having a front frame member 2, a back frame member 3, and side frame members 4 spaced parallel to each other, both ends of said side frame members 4 being rotatably connected to the front and the back frame members so as to form a movable parallelogram;
   a plow body 6 attached to the back frame member 3 of the regulating frame 1;
   a reversing rod 17 rotatably attached to the back frame member 3 of the regulating frame 1; and
   a fixing member 24 supported by said both side frame members 4 of the regulating frame 1 and being parallel to the back frame member 3 and having a plurality of engaging portions 28 with which the front end portion of the reversing rod 17 is detachably and selectively engaged;
   said plow body 6 comprising an arm 7 having a front end fixed to the back frame member 3, a sleeve 8 fixed to the bottom end of said arm 7, a rotary shaft 9 rotatably mounted in said sleeve 8, a plow share 10 fixed to a front end of said rotary shaft 9, a plurality of plate bars 11 having bottom ends pivotally attached to a back side of said plow share 10, a connection frame 12 engaging an engaging rod 13 attached to the arm 7, a reversing rod 14 having a lower end secured to a back end of the rotary shaft 9 and having an upper end engaged with a rear portion of said reversing rod 17, and a plowing base 15 attached to the underside of the sleeve 8;
   said plow body 6 being located selectively at the back and on the centerline of the tractor or on either side of the tractor by rotating through a predetermined angle the regulating frame 1, and the operating direction of the plow share 10 and plate bars 11 can be varied selectively by engaging selectively the reversing rod 17 with any one of the engaging portions 28, in a state that the front frame member 2 of the regulating frame 1 is connected with the tractor.

2. A reversible plow as claimed in claim 3, further comprising a fixing plate 32 having a plurality of engaging portions 33 provided on said front frame member 2, and an engaging plate 36 having an engaging projection 37 capable of engaging with any one of said engaging portions 33 of said fixing plate 32 and rotatably supported by one of said side frame members 4, said regulating frame 1 being rotatable through a predetermined angle by engaging selectively said engaging projection 37 with any one of said engaging portions 33 of said fixing plate 32.

3. A reversible plow as claimed in claim 1, in which said fixing member 24 comprises a first engaging member 27 supported by both side frame members 4 of the regulating frame 1 and being parallel to the back frame member 3 and having a plurality of engaging portions 28 with which the front end portion of the reversing rod 17 is detachably and selectively engaged, and a second engaging member 30 secured in parallel to the first engaging member 27 and having a plurality of engaging portions 31 with which the front end portion of the reversing rod 17 detachably and selectively engaged when said regulating frame 1 is shifted to the greatest extent.

* * * * *